(12) United States Patent
Püttmann

(10) Patent No.: US 8,336,644 B2
(45) Date of Patent: Dec. 25, 2012

(54) ROD COUPLING HAVING A PIN

(75) Inventor: Franz-Josef Püttmann, Lennestadt (DE)

(73) Assignee: Tracto-Technik GmbH & Co. KG, Lennestadt (DE)

( * ) Notice: Subject to any disclaimer, the term of this patent is extended or adjusted under 35 U.S.C. 154(b) by 334 days.

(21) Appl. No.: 12/594,702

(22) PCT Filed: Apr. 4, 2008

(86) PCT No.: PCT/EP2008/002714
§ 371 (c)(1),
(2), (4) Date: Apr. 13, 2010

(87) PCT Pub. No.: WO2008/122423
PCT Pub. Date: Oct. 16, 2008

(65) Prior Publication Data
US 2010/0196089 A1    Aug. 5, 2010

(30) Foreign Application Priority Data

Apr. 5, 2007  (DE) .......................... 10 2007 016 822

(51) Int. Cl.
*E21B 17/02* (2006.01)
(52) U.S. Cl. ....................... 175/320; 166/242.6; 403/353
(58) Field of Classification Search .................. 403/348, 403/353; 166/242.6; 175/320
See application file for complete search history.

(56) References Cited

U.S. PATENT DOCUMENTS

| | | | | |
|---|---|---|---|---|
| 709,762 A * | 9/1902 | Greaves | ......................... | 403/353 |
| 721,427 A * | 2/1903 | Cope | ............................. | 403/353 |
| 730,186 A * | 6/1903 | Case | ............................. | 403/353 |
| 1,604,542 A * | 10/1926 | Wieland | ........................ | 403/353 |
| 1,870,135 A * | 8/1932 | Norley | ........................... | 403/353 |
| 1,974,540 A * | 9/1934 | Norley | ........................... | 403/353 |
| 5,188,539 A * | 2/1993 | Langdon | ....................... | 439/341 |
| 7,874,382 B2 | 1/2011 | Püttmann et al. | | |
| 7,954,565 B2 | 6/2011 | Püttmann | | |
| 2006/0110219 A1 | 5/2006 | Püttmann | | |
| 2009/0003935 A1 | 1/2009 | Püttmann | | |

FOREIGN PATENT DOCUMENTS

| | | |
|---|---|---|
| DE | 312 215 C | 5/1919 |
| DE | 312 667 C | 6/1919 |
| DE | 369 691 C | 2/1923 |
| DE | 371 228 C | 3/1923 |
| DE | 717 535 | 2/1942 |
| DE | 196 08 980 C2 | 9/1997 |
| DE | 297 13 354 U1 | 12/1998 |
| DE | 199 18 530 A1 | 10/2000 |
| DE | 100 65 533 A1 | 7/2002 |
| WO | WO 2007/008087 | 1/2007 |

* cited by examiner

*Primary Examiner* — Michael P Ferguson
(74) *Attorney, Agent, or Firm* — Henry M. Feiereisen, LLC

(57) ABSTRACT

The invention relates to a rod coupling for rod segments for use in horizontal earth boring, wherein the ends of the rod segments can be interconnected and are fixed by means of a cross pin.

1 Claim, 5 Drawing Sheets

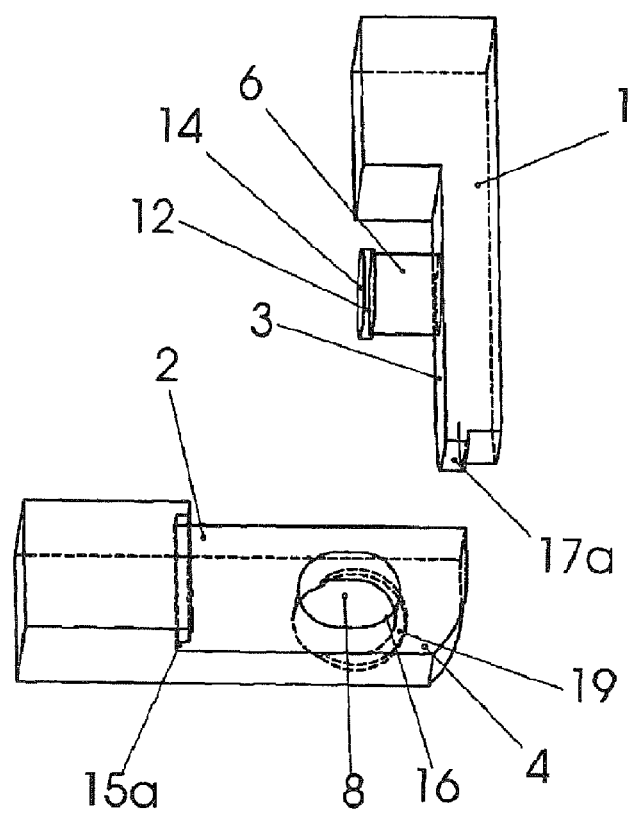
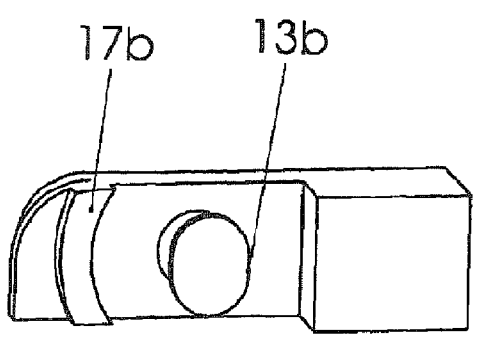
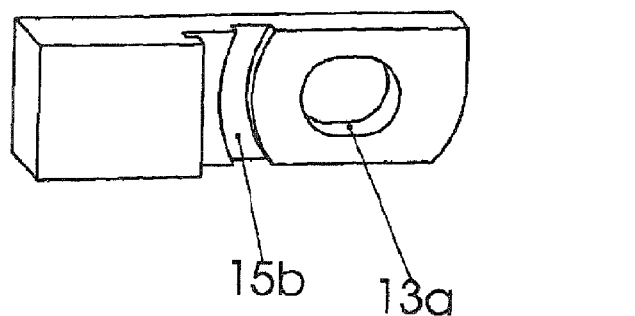
Fig. 1 a)
Fig. 1 b)

ROD COUPLING HAVING A PIN

CROSS-REFERENCES TO RELATED APPLICATIONS

This application is the U.S. National Stage of International Application No. PCT/EP2008/002714, filed Apr. 4, 2008, which designated the United States and has been published as International Publication No. WO 2008/122423 and which claims the priority of German Patent Application, Serial No. 10 2007 016 822.7, filed Apr. 5, 2007, pursuant to 35 U.S.C. 119(a)-(d).

The invention relates to a rod coupling as it is used for connecting rod assemblies for underground horizontal boring and trench-less installation or replacing of pipelines (horizontal boring hereinbelow).

In horizontal boring, individual rod assemblies are strung together, connected with each other and moved through the ground by means of a push, pull, or rotary drive. In the case of longer borings, the rod assembly includes multiple rod segments which are, in accordance with the progress of the boring, connected with or separated from each other, one at a time. The individual segment is of limited length and must be very short particularly when the boring takes place in a short building pit, for example a hopper, inspection chamber, or man hole. Such hoppers can have diameters of, in part, less than one meter.

To connect the rod segments, couplings of various construction are available, wherein screw thread couplings are widely used. Aside from the problem that screwing the threaded connections takes a relatively long time and requires clean threads, such connections are particularly disadvantageous in that they allow for rod assembly rotation during the boring progress in one direction only. In the case of, for example, a threaded connection with right-hand thread, rod assembly rotation can only take place in a clockwise direction since otherwise the threaded connection would separate by the boring process.

Therefore, plug-in couplings were developed in the prior art. In contrast to screw couplings, when using plug-in couplings, the problem of fixing the coupling in the coupling mouth after plug-in must be solved since the adhesion-based fixation possibility for the screw threads is not available.

DE 297 13 354 U1 teaches a rod coupling wherein a first coupling part is inserted into a second coupling part. To couple the rod assemblies in accordance with the disclosure of this design patent, the front free end of the first coupling part is pushed, under an angle of about 60° relative to the longitudinal axis of the second coupling part and from the top, into a channel-like receptacle of the second coupling part. Therein, hemispherical protrusions of the first coupling part engage recesses of the second coupling part. From this position, in which the two pipe endings are in an angular relation to each other, the first coupling part and the recesses are pivoted so that the first coupling part reaches the channel-like receptacle of the second coupling part where it is tightly received.

Subsequently, the connection is secured by a safety element in form of a safety sleeve.

DE 196 08 980 C2 and DE 199 18 530 A1 teach rod couplings without the known thread connection and which have at the front end of the rod segment to be coupled an axially protruding lug-like attachment piece that glidingly engages the back end of the preceding rod segment. For this purpose, the face side of the preceding rod segment has an axial slit with a groove into which the lug-like attachment piece can be pushed. Thereby, a pin-like protrusion is brought into a bearing bore of the slit via the groove. By pivoting the subsequent rod segment, the rod segment is moved from the angular plug-in position to the extended position and subsequently positioned in coaxial relation to the preceding rod segment. The axial position is only guaranteed in this position, whereas the lateral fixation is effected by the side walls of the rod segments. Alternatively, the pin-like protrusion is laterally inserted into the slit and then pivoted from the angular plug-in position into the extended position. To ensure that the pin does not fall out of the slit, lateral fixation is provided through protruding side walls of the rod segments, which prevent falling apart of the coupling in the extended position.

DE 100 65 533 A1 describes a coupling in which the rod segments are plugged together. Therein, corresponding ends of the rod segments are connected by parallel-shifting of the rod segment axes, whereby, during parallel-shifting, the rod segments have an angle of a <180° in relation to each other. Thereby, a first rod segment has a pin which engages a corresponding recess of a second rod segment. An undercut prevents the pin from falling out. After rotating in, the undercut engages a shoulder at the subsequent rod segment or prevents falling out through spring-loaded pegs that engage a recess in the face side of the end of the subsequent rod segment.

The solutions proposed in the prior art secure the rod segment couplings against radial or axial falling apart by safety sleeves, safety protrusions, spring-loaded pins or by the principle of insertion and removal in an angular position during operation in the extended position.

SUMMARY OF THE INVENTION

It is an object of the invention to provide a simplified or more broadly applicable rod coupling for horizontal boring.

This object is achieved by a rod coupling and a method in accordance with the independent claims. Advantageous further developments are the subject matter of the respective subclaims.

The invention is based on the idea of providing a boring rod assembly that has a plug-in coupling, wherein the geometric shape of a stop ridge allows for insertion at a certain angular position (plug-in angle), i.e., at a defined angular position outside the work angle, and, at the same time, provides for fixation across a wide angular range (work angle) in a corresponding receptacle.

Therein, insertion is possible both in an axial and a radial direction, depending on the configuration of the coupling. For this purpose, the geometry of the stop ridge and/or the recess can deviate from a circular cross-section.

For example, the stop ridge can be embodied as a pin which is laterally inserted into the recess, as described in DE 100 65 533. At a certain angular position of the rod segments in relation to each other, the corresponding recess allows for lateral insertion of the pin (plug-in angle) in that the recess and the pin have a flat area or in that one or more corresponding grooves for the shoulders are provided in a circular segment of the recess. Outside this angular position, i.e., at the work angle, the shoulders of the pin provide for radial fixation of the rod segments with respect to each other in that they engage behind the recess outside the circular segment of the smaller radius or the groove(s).

The stop ridge can also be provided as a coupling part that is to be axially inserted into the recess. Therein, in accordance with the invention, an area of the pin can have a flat area for axial fixation. In this case, the recess, the coupling mouth, or the insertion channel have a corresponding geometry that allows for insertion of the pin at a certain angular position (plug-in angle). If the stop ridge is located in the recess, the stop ridge is secured against axial shifting as soon as it leaves the angular position of insertion because then the geometries that allow for insertion and removal no longer align.

The invention does not preclude transferring a radial or axial fixation via an additional tongue and groove joint, wherein, for example, the groove and tongue have the shape of a pitch circle and wherein the groove is rotated into the tongue during connection of the rod segments.

The coupling in accordance with the invention can be used with different kinds of rod assemblies and even with a support device for redirecting the push or pull forces from the drive axis into the pipeline axis.

Independently thereof, both sides of the coupling in accordance with the invention can be shaped as circular arc segments, i.e. concave/concave or concave/convex in order to match the shape of different support devices or in order to be operated in different curve directions.

BRIEF DESCRIPTION OF THE DRAWING

The invention is described in more detail below by means of the embodiment shown in the drawing.

The drawing shows in:

FIGS. 1a and b the front end of the rod segment in accordance with the invention with one coupling half and the back end of the rod segment with the other coupling half, with a radial fixation via an additional tongue and groove joint (a) and an axial fixation via an additional tongue and groove joint (b);

DETAILED DESCRIPTION OF PREFERRED EMBODIMENTS

Figure 2:
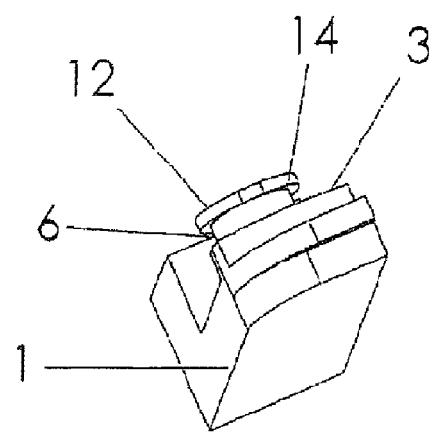
FIG. 2 a detailed view of a coupling pin in accordance with the invention.

The rod coupling according to FIG. 1 includes a first coupling member 1 and a second coupling member 2. Each of the coupling members has coupling area 3 or 4, wherein the coupling area 3 has a pin 6 that is not completely cylindrical and that corresponds to a recess 8 of the coupling area 4. At its ends, the pin 6 has two shoulders 12, 14 that are vertically oriented in relation to the plane of the rod assembly axis. The recess 8 is non-cylindrically shaped (see section 13b) and has a groove 16 that corresponds to the shoulders 12, 14 and that is horizontally oriented in relation to the rod assembly axis.

Figure 3:
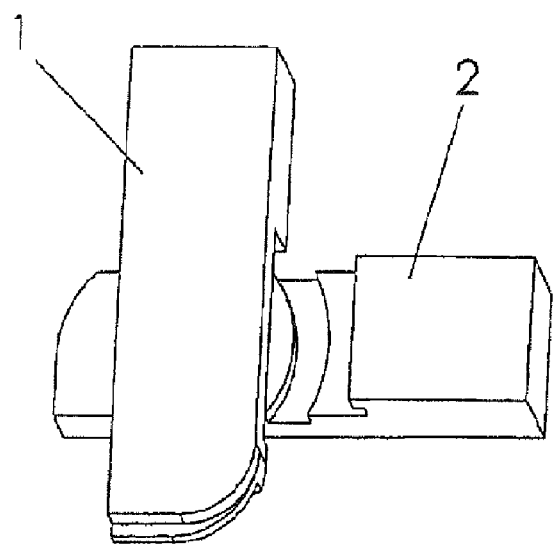
FIG. 3 two rod segments after insertion in an angular position.
Figure 4:
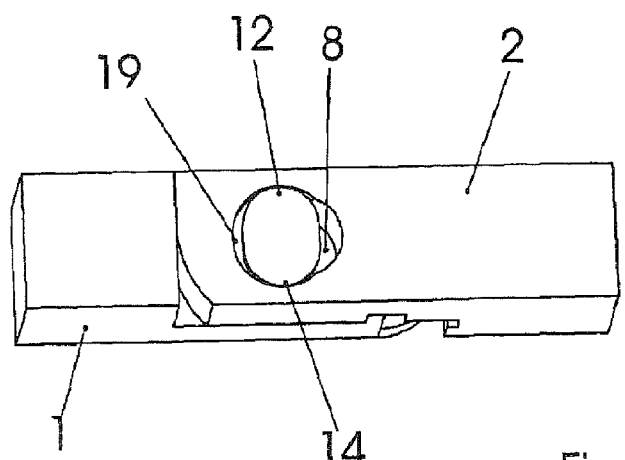
FIG. 4 two rod segments after pivoting into the extended position.
Figure 5:
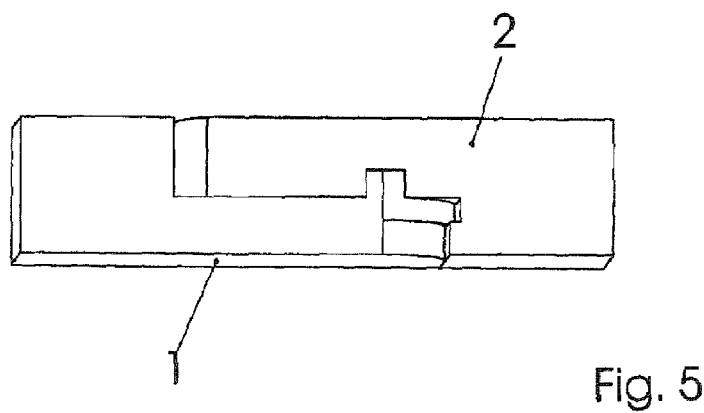
FIG. 5 a different view of the two rod segments of FIG. 4 after pivoting into the extended position.
Figure 6:
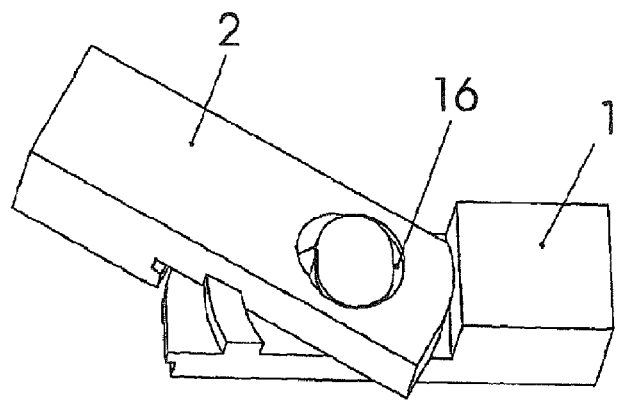
FIG. 6 the ready-to-operate coupling in an angular operational position.

The orientation of the shoulders 12, 14 and the flat areas 13a and 13b as well as the groove 16 effectuate that the rod segments must be arranged at a right angle in relation to each other when they are being connected so as to align the shoulder 12 with the groove 16 (cf. position in FIG. 3). If the flat areas 13a and 13b align (plug-in angle), the pin 6 can be inserted into the recess 8. As soon as the rod segments leave their right-angled relative position, the shoulders 12, 14 secure the pin 6 in the recess 8, via an undercut 19, at all angles up until the extended position (cf. FIG. 4) or in that they escape at the opposite side of the recess 8 (not illustrated).

A radial (FIG. 1a) or axial (FIG. 1b) fixation of the coupling is provided via an additional groove 15a, b and tongue 17a, b. During connection of the rod segments, the groove is rotated into the tongue.

Figure 7:
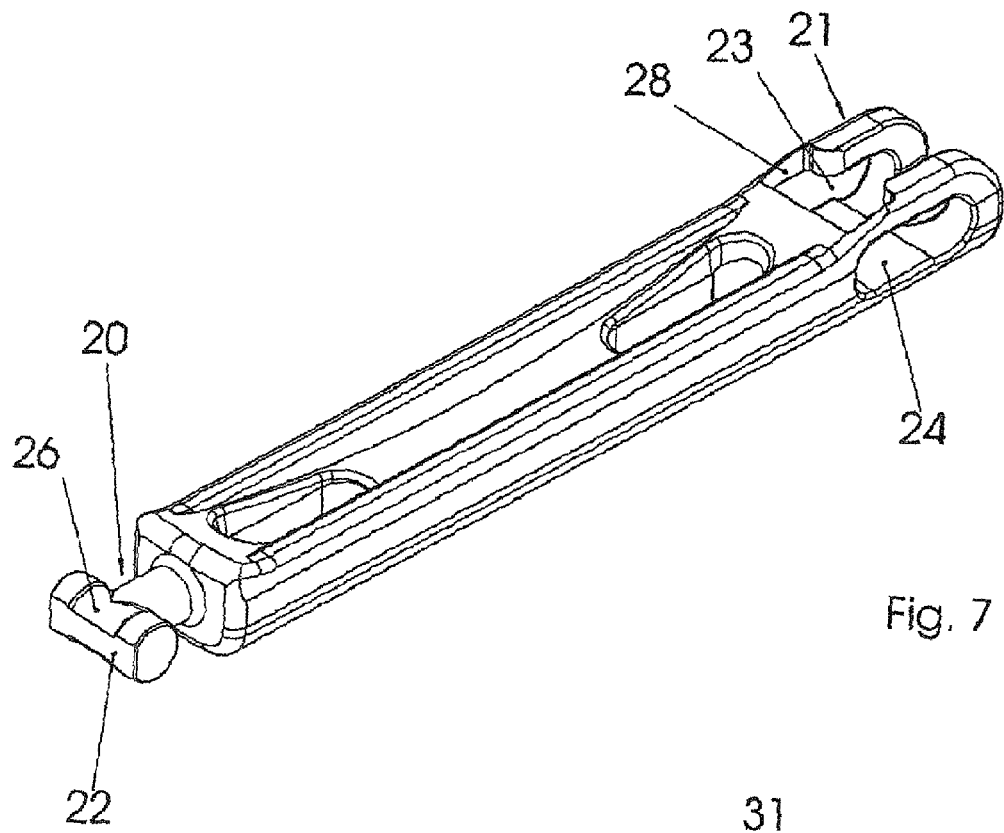
FIG. 7 an alternative embodiment of the coupling in accordance with the invention with a coupling that can be axially inserted.

FIG. 7 shows an embodiment in accordance with the invention in which a stop ridge 26, which has a flat area 22 on its face side and which is located at the first coupling part 20, is axially inserted, via a longitudinal ridge 24, into a transverse recess 28 located at second coupling part 21. The transverse recess 28 has a non-cylindrical section 23. Due to the flat area 22 on the face side at the stop ridge 26, the rod segments must be positioned at an angle of 90° relative to each other (plug-in angle) when the stop ridge 26 is inserted into the transverse recess 28. The circular cross-section of the transverse recess 28 ensures a secure fixation of the stop ridge 26 in the transverse recess 28 for all other angles up until the extended position.

Figure 8:
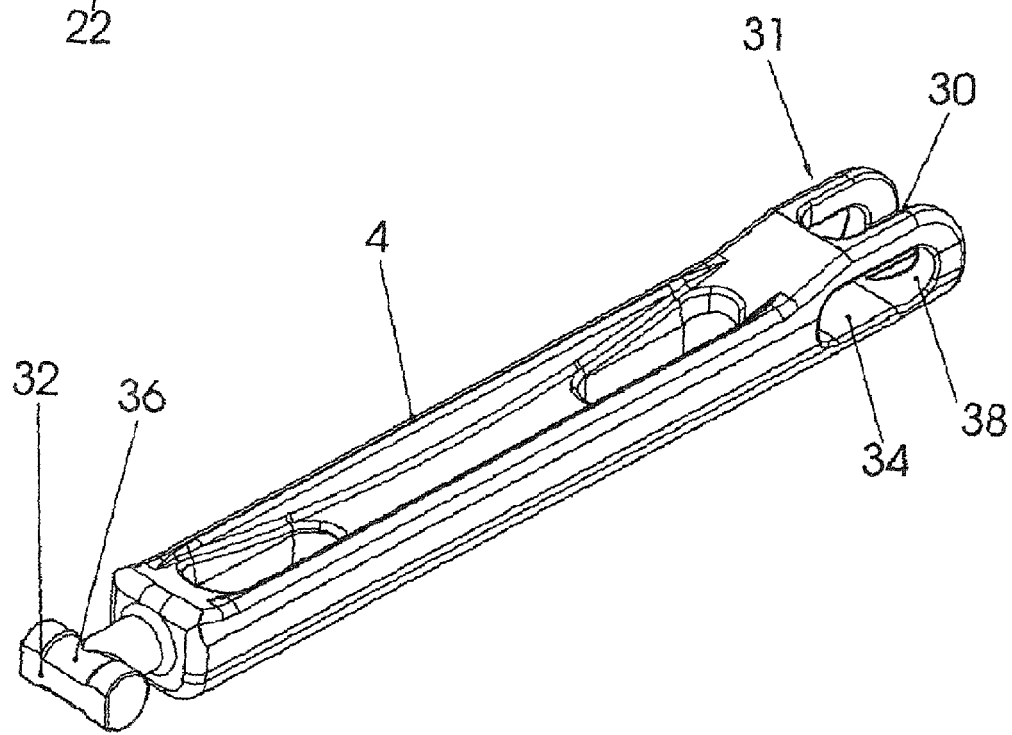
FIG. 8 a further alternative of the invention with an L-shaped coupling mouth.
Figure 9:
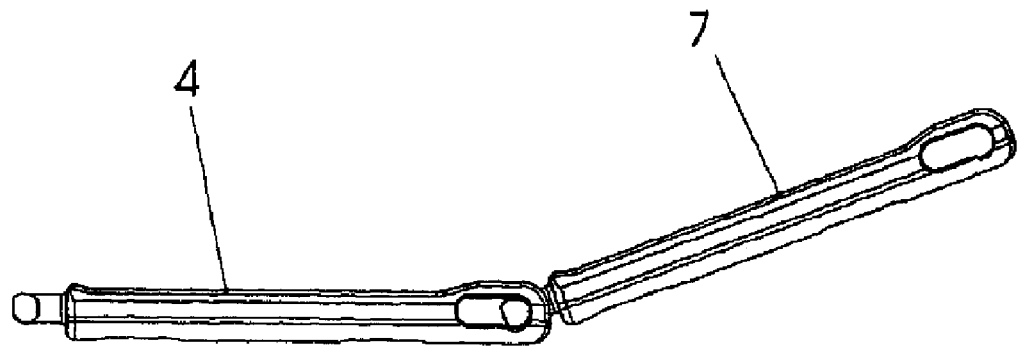
FIG. 9 the embodiment of FIG. 8 in an angular position (plug-in position)
Figure 10:
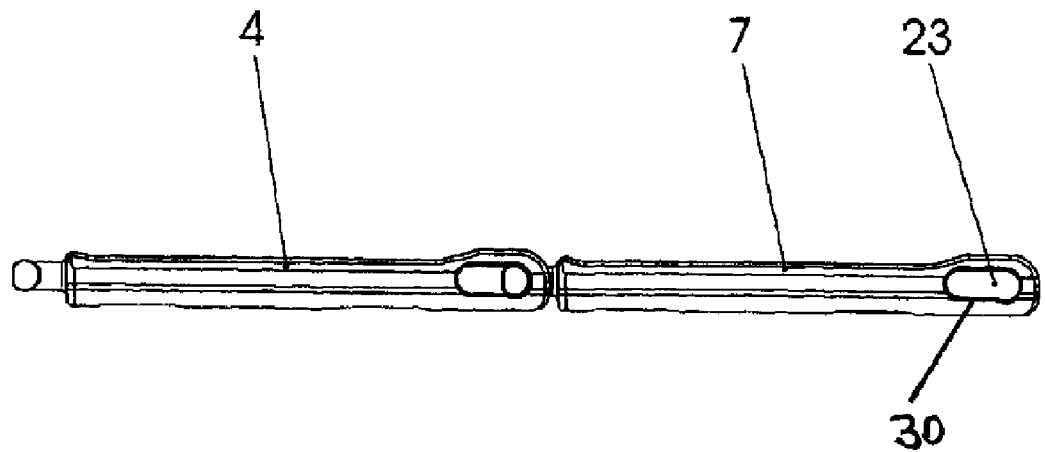
FIG. 10 the embodiment of FIG. 8 in an extended position.

In the embodiment of FIG. 8, the rod segment 31 has an L-shaped coupling mouth 30. The coupling mouth 30 (see also FIG. 10) is arranged in relation to the transverse recess 38 in such a way that the stop ridge 36 must be initially rotated by 90° after insertion into the coupling mouth before it is subsequently shifted into the transverse recess 38. As soon as the stop ridge 36 has reached its deepest insertion position in the coupling mouth 30 and, thus, touches with the flat area 32 the longitudinal ridge 34, the rod segment 4 is axially rotated by 90° and then shifted along the axis of the rod segment into the end position in accordance with FIG. 7. This is possible due to the flat area 32. In this position, the two rod segments 4, 7 are again connected to each other as soon as they leave the 90° angular position because the geometry of the stop ridge 26 only allows for leaving the transverse recess 38 if the flat area 32 is located in the plane of the longitudinal ridge 34. The rod segments can be pivoted against each other, for example out of the angular position in accordance with FIG. 9 and into an extended operational position in accordance with FIG. 10, and are, even in the intermediate angular positions, connected to each other with essentially no play.

What is claimed is:

1. A plug-in coupling between first and second rod segments for underground horizontal boring, comprising:

first and second coupling members formed at opposing ends of each rod segment, wherein each first coupling member comprises a stop ridge, said stop ridge having a transversely extending head, said head having a cylindrical-shaped cross section with a flat side wall; and wherein each second coupling member comprises a pair of opposing arms which have aligned longitudinally extending slots, and a transverse opening which extends through a respective side wall of each of the opposing arms and opens into a first end of the slots and has a length corresponding to at least a transverse length of the head of the stop ridge and a width corresponding to at least a diameter of the cylindrical-shaped cross section of the head, wherein each slot has a flat side wall opposite the transverse recess which defines a reduced cross sectional shape, wherein a second end of the slots has an enlarged cross sectional shape corresponding to the diameter of the cylindrical shape of the head, and wherein the second coupling member includes a coupling mouth extending between the pair of opposing arms, and wherein the stop ridge of the first coupling member of the first rod segment is inserted into the transverse opening of the second coupling member of the second rod segment such that the flat side wall of the head of the respective said stop ridge is aligned with and abuts the flat side wall of the respective said slots of the second rod segment, and wherein the head is longitudinally slid to the second end of the slots and the first and second rod segments are rotated relative to each other such that the cylindrical shape of the head retains the stop ridge within the second end of the slots and the first coupling member of the first rod segment extends through the coupling mouth of the second rod segment.

* * * * *